(12) United States Patent
Alvarez

(10) Patent No.: US 11,455,921 B1
(45) Date of Patent: Sep. 27, 2022

(54) DEVICE FOR SECURING A DISPLAY TO A DOOR

(71) Applicant: Mariano Alvarez, Bakersfield, CA (US)

(72) Inventor: Mariano Alvarez, Bakersfield, CA (US)

( * ) Notice: Subject to any disclaimer, the term of this patent is extended or adjusted under 35 U.S.C. 154(b) by 0 days.

(21) Appl. No.: 17/686,264

(22) Filed: Mar. 3, 2022

Related U.S. Application Data

(60) Provisional application No. 63/156,448, filed on Mar. 4, 2021.

(51) Int. Cl.
*G09F 19/22* (2006.01)
*F16M 13/02* (2006.01)
*F16M 11/04* (2006.01)

(52) U.S. Cl.
CPC ........... *G09F 19/227* (2021.05); *F16M 11/04* (2013.01); *F16M 13/02* (2013.01)

(58) Field of Classification Search
CPC . E06B 3/7001; E06B 3/88; E06B 1/34; E06B 7/28; F16M 13/02; F16M 11/04; G09F 19/227; G09F 21/04; G09F 21/048; G09F 15/0025; G09F 17/00; G09F 2007/1865; G09F 2007/1886; G09F 7/18
See application file for complete search history.

(56) References Cited

U.S. PATENT DOCUMENTS

| | | | | |
|---|---|---|---|---|
| 2,620,579 A * | 12/1952 | Dienes | ..................... | G09F 21/04 40/591 |
| 3,276,512 A * | 10/1966 | Gallagher | ................ | B60J 11/00 160/368.1 |
| 3,461,584 A * | 8/1969 | Wilson | ................... | G09F 21/048 40/591 |
| 3,701,210 A * | 10/1972 | Smith | ................... | G09F 21/042 116/28 R |
| 4,800,947 A * | 1/1989 | Loomis | ............... | G09F 15/0025 160/368.1 |
| 5,058,299 A * | 10/1991 | Suzuki | ...................... | G09F 7/18 40/607.13 |
| 5,351,733 A * | 10/1994 | Ullman | ..................... | E06B 7/28 206/321 |
| 5,373,655 A * | 12/1994 | Suzuki | .................. | G09F 21/048 40/590 |
| 5,555,659 A * | 9/1996 | Hade | ....................... | G09F 17/00 40/604 |
| 5,893,226 A * | 4/1999 | Sophocleous | ........... | G09F 17/00 40/591 |
| 6,092,319 A * | 7/2000 | Hicks | .................... | G09F 21/048 40/590 |

(Continued)

*Primary Examiner* — Patrick D Hawn
(74) *Attorney, Agent, or Firm* — James M. Duncan; Scanlon Duncan LLP

(57) ABSTRACT

A device for securing a display to a door utilizes attachment clips which attach to the door. The attachment clips each have a first side wall, a second wall and an end wall which extends between the first side wall and the second side wall. An arm is attached to the first side wall. The arm is attached to a display retaining assembly which is configured, upon installation, to retain the display against the door, where the display retaining assembly applies a load which causes the first side wall to engage a first surface of the door and the second side wall to engage a second side of the door, thereby urging the end wall against a side of the door.

7 Claims, 15 Drawing Sheets

(56) References Cited

U.S. PATENT DOCUMENTS

| | | | | |
|---|---|---|---|---|
| 6,101,751 A * | 8/2000 | Hicks | ............... | G09F 21/048 |
| | | | | 40/590 |
| 6,339,889 B1 * | 1/2002 | Griesemer | ........... | G09F 21/048 |
| | | | | 40/590 |
| 6,588,133 B1 * | 7/2003 | Garrity | ............... | G09F 21/048 |
| | | | | 40/591 |
| 6,698,123 B2 * | 3/2004 | Smith | ............... | G09F 21/04 |
| | | | | 160/385 |
| 6,789,833 B1 * | 9/2004 | Alber | ............... | B60R 13/00 |
| | | | | 40/643 |
| 7,198,835 B2 * | 4/2007 | Anderson | ............ | A47H 99/00 |
| | | | | 52/311.1 |
| 7,448,173 B2 * | 11/2008 | Brisbois | ............... | E06B 3/7001 |
| | | | | 52/584.1 |
| 7,941,950 B2 * | 5/2011 | Leeds | ............... | G09F 15/0037 |
| | | | | 40/606.01 |
| 8,296,978 B2 * | 10/2012 | Stewart | ............ | G09F 15/0025 |
| | | | | 40/590 |
| 8,967,398 B2 * | 3/2015 | McLemore | ........... | F16M 13/02 |
| | | | | 211/113 |
| 9,626,885 B1 * | 4/2017 | Alvarez | ............... | E06B 7/28 |
| 10,458,451 B1 * | 10/2019 | Garza | ............... | F16B 5/0635 |
| 2008/0168731 A1 * | 7/2008 | Dudley | ............... | E06B 7/30 |
| | | | | 52/745.19 |
| 2010/0300003 A1 * | 12/2010 | Goode | ............... | E06B 3/72 |
| | | | | 49/504 |

\* cited by examiner

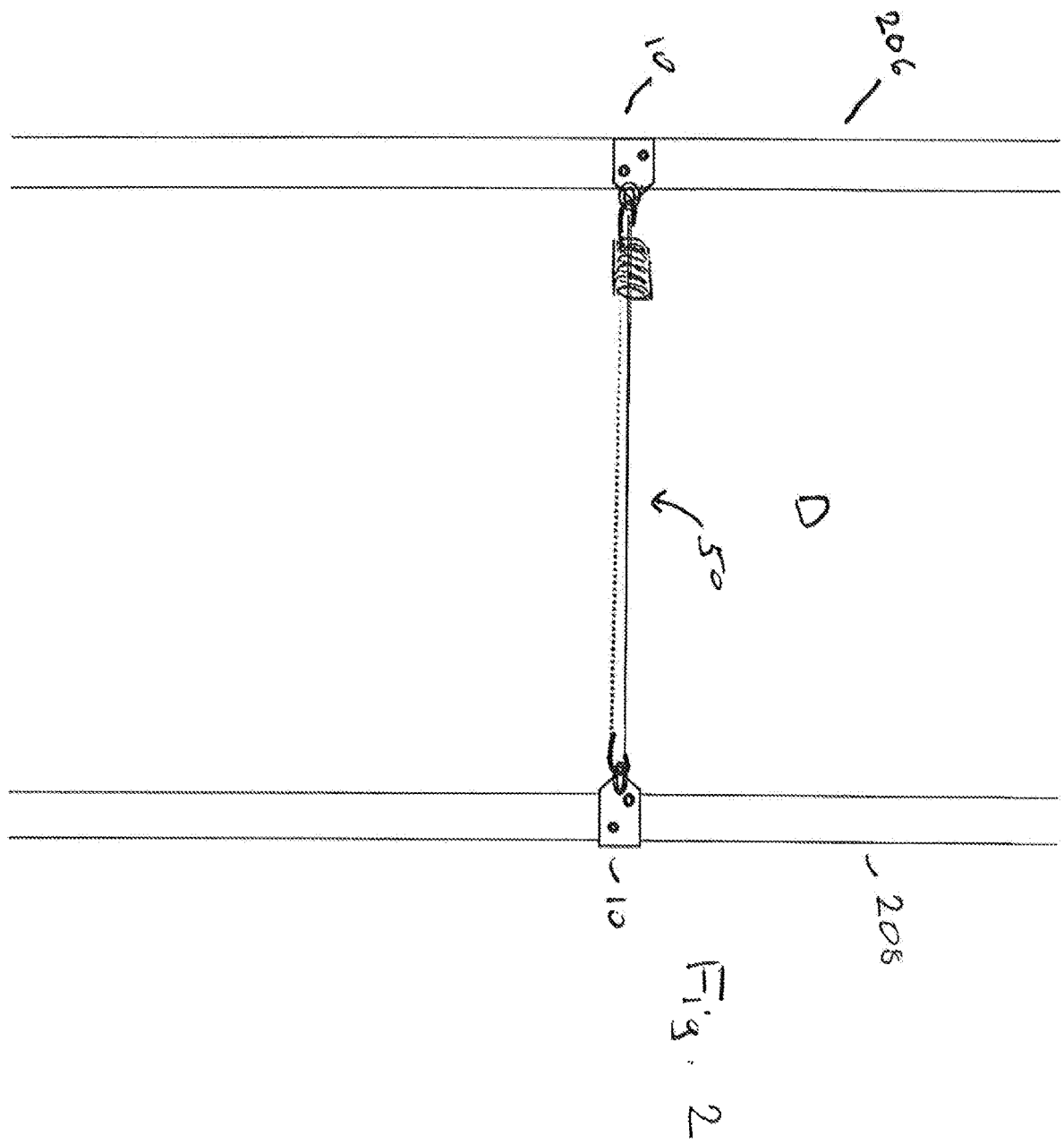

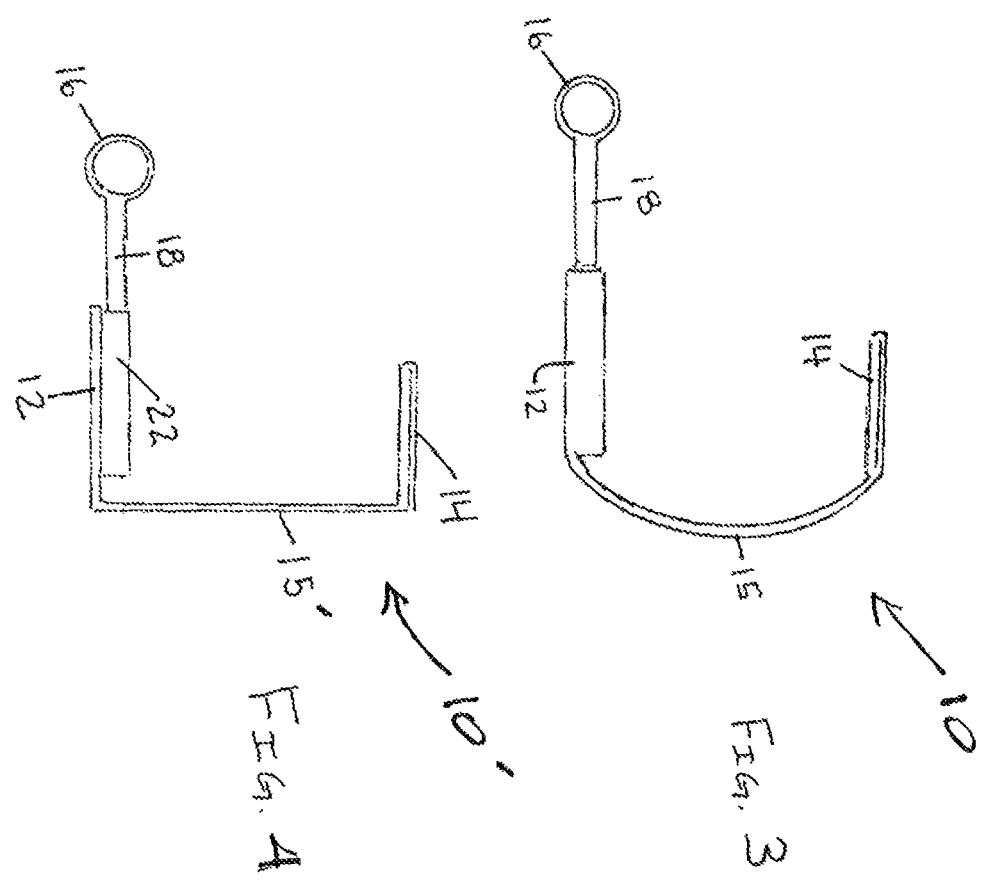

US 11,455,921 B1

DEVICE FOR SECURING A DISPLAY TO A DOOR

RELATED APPLICATIONS

This application claims priority to Provisional Patent Application No. 63/156,448 filed on Mar. 4, 2021.

BACKGROUND AND FIELD

The present disclosure relates generally to a device for mounting a display to an object, and more specifically to a device for securely mounting a display to a door.

Door displays are commonly used by businesses to provide a variety of information to the public. Such information may include advertisements, marketing information, business hours, product specials, and the like. Such information is often affixed to the exterior of the door or to an interior side of a glass door. This may be done in a variety of ways, ranging from simple methods such as taping the display to the exterior of the door, to methods such as utilizing suction cups or other fasteners to secure the display to the exterior of the door. Such displays are easily removed, however, because the fasteners or other mechanisms used to attach the display to the exterior of the door are accessible to, and capable of being manipulated by, anyone with access to the exterior of the door.

In addition to the door displays described above, it may be desirable to securely affix other items to a door, such as a thin screened plasma or LED electronic display screen. Such screens may be utilized to display still and moving images. It is desirable that in affixing these types of items to a door, the device adequately mounts the item to secure it from falling due to motion of the door or other disturbance of the item.

SUMMARY

One aspect of the present disclosure provides a device for securing a display to a door. The device has a first attachment clip having a first side wall, a second side wall, an an end wall extending between the first side wall and the second side wall, and an arm attached to the first side wall and extending away therefrom. The device further comprises a display retaining assembly which is configured, such that when the device has been installed to the door, to retain the display against the door. The display retaining assembly is attached to an end of the arm distal to the end wall. The display retaining assembly is configured to apply a load such that the display retaining assembly causes the first side wall to engages a first surface of the door, the second side wall to engage a second side of the door, and urges the end wall against a side of said door. The device may have a second attachment clip which may be substantially the same as the first attachment clip. The second attachment clip is attached to an end of the display retaining assembly where the display retaining assembly is configured to apply a load which urges a second attachment clip end wall against a second side of the door.

The display retaining assembly may comprise a rod member having a spring attached to an end thereof to form a rod-spring combination, where the rod-spring combination is disposed between the first attachment clip and the second attachment clip.

Alternatively, for a door having a sheet of glass disposed within a glass pocket, the display retaining assembly may comprise a frame assembly having a left side rail configured to be urged against a left side of the glass pocket and a right side rail configured to be urged against a right side of the glass pocket. A bottom rail may span between the left side rail and the right side rail, where the bottom rail is configured to be disposed at the bottom of the glass pocket. A lower left side clip track may be attached to a bottom of the left side rail and a lower right side clip track may be attached to a bottom of the right side rail. The bottom rail may have a left end attached to the lower left side clip track and a right end attached to the lower right side clip track. The first attachment clip described above may attach to the lower left side clip track and the second attachment clip, also described above, may attach to the lower right side clip track.

The display retaining assembly may further have an upper left side clip track attached at an upper end of the left side rail and an upper right side clip track attached at an upper end of the right side rail. A third attachment clip may be attached to the upper left side clip track and a fourth attachment clip may be attached to the upper right side clip track, where the third attachment clip and the fourth attachment clip are configured substantially the same as the first attachment clip and the second attachment clip. An upper rail member may span between the left side rail and the right side rail, where the upper rail is disposed above the upper left side track and the upper right side track.

A method of attaching a display to a glass door utilizes the clips and display retaininig assembly disclosed herein.

BRIEF DESCRIPTION OF THE FIGURES

FIG. 2 shows an embodiment of the present apparatus attached to a door.

FIG. 3 is a top elevation view of an a door clip which may be utilized with embodiments of the invention.

FIG. 4 is a top elevation view of an another embodiment of a door clip which may be utilized with embodiments of the invention.

DETAILED DESCRIPTION

Terms such as "top," "bottom," "side," "front," "rear," "left," "right," and other such directional terms as used for ease and clarity in describing the present invention with respect to the accompanying figures. Unless otherwise state, such terms are not limitations on the disclosure of the invention described herein.

Figure 1:
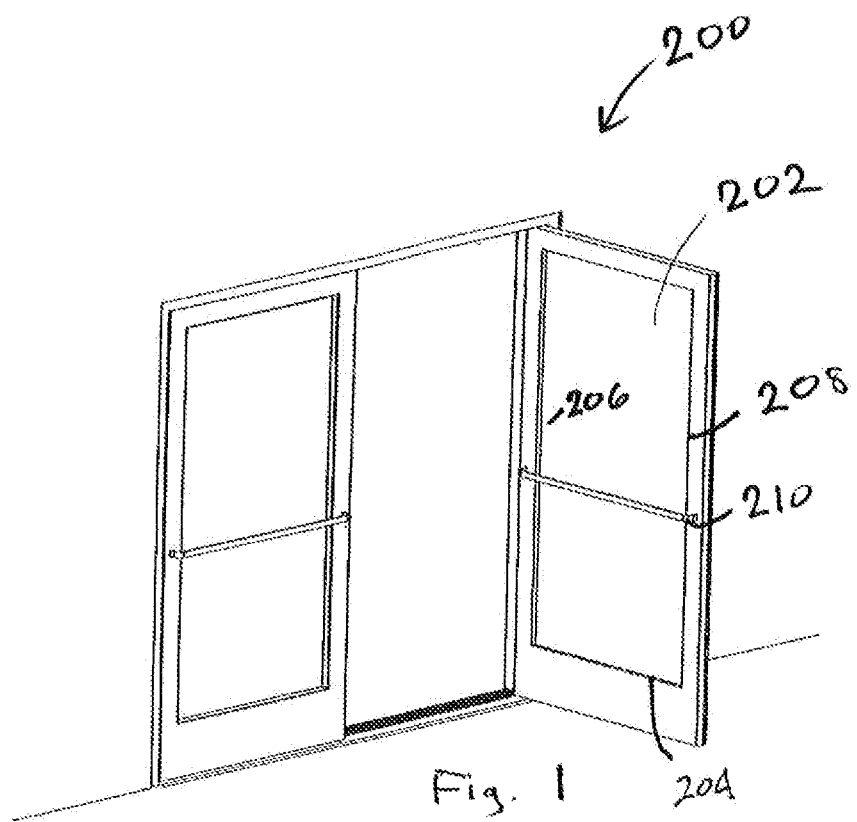
FIG. 1 depicts an example of a double acting glass door for which embodiments of the present invention may be utilized for attaching a display.

The device of the present disclosure is described herein in the context of a door display. Embodiments of the device may be utilized on solid doors. Alternatively, embodiments of the device may be utilized with double acting glass doors, such as glass doors 200 depicted in FIG. 1, which are frequently utilized with commercial business buildings, including retail stores, restaurants, and the like. Glass doors 200 typically have a sheet of glass 202 set within a glass pocket having a bottom 204, a left side 206 and a right side 208. Such glass doors 200 typically have a handle member 210 which spans across the door.

FIG. 2 shows a first embodiment of an device which may be utilized for securing a display D to a door or 200 or other door. The device utilizes door clips 10 which utilize a display retaining assembly 50 which applies a load which retains the door clips 10 and the display D in place. Door clips 10 respectiely engage the left side 206 and right side 208 of door 200. As described below, door clips 10 have a novel design which facilitate attachment of the display D.

Figure 5:
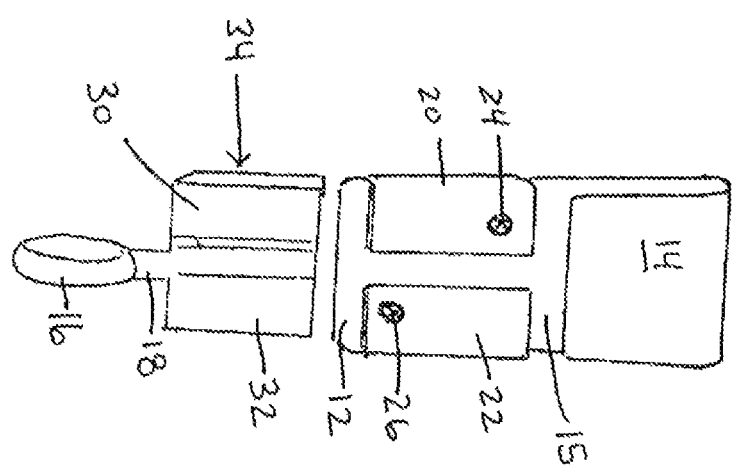
FIG. 5 is a top view of an embodiment of a door clip of the present disclosure.

As generally shown in FIGS. 3-5, embodiments of a door clip 10, 10' have a first side wall 12, a second side wall 14, and an end wall 15 extending between the first side wall and the second side wall. A ring 16 may be optionally attached to the first side wall 12, extending therefrom via arm 18. In the embodiment of door clip 10 shown in FIG. 3, side wall 15 has a curvature associated therewith, while the door clip 10' depicted in FIG. 4 has a flat side wall 15' Although in many instances the embodiment shown in FIG. 3 may be used interchangeably with the embodiment of the ring clip 10' shown in FIG. 4, in some cases the physical characteristics of a door may lease a user to prefer one embodiment over another.

As illustrated in FIG. 2, ring 16 or other attachment mechanism is utilized for attachment of display retaining assembly 50 which exerts a force against a portion of the door to which door clip 10, 10' will be secured. As shown in FIGS. 3-5, ring 16 may be connected by ring arm 18 to a body 34 formed of a first shoulder 30 and a second shoulder 32 extending away from ring arm 18 in opposing directions. It is contemplated that body 34 might also be a single, uniform structure and a shortened ring arm 18 may attach ring 16 to that structure. It is contemplated that the edge of ring 16 does not lay flat along the same plane as ring arm 18, but that instead the ring 16 is perpendicular to the plane of ring arm 18 and body 34. Ring arm 18 may be of any suitable length and may be adjustable to allow for variable positioning of ring 16 with respect to the side walls or body of the device.

As shown in FIG. 5, first side wall 12 may comprise two tabs 20 and 22, where the tabs and side wall 14 have a generally elongated c-shaped cross-section between them. First tab 20 has a first aperture 24 and second tab 22 has a second aperture 26. First aperture 24 and second aperture and 26 may be threaded so that an appropriately-sized screw may engage each respective aperture. In use, body 34 may be inserted into the space between side walls 14 and first and second tabs 22 and 24. Screws (not shown) can then be inserted into apertures 24 and 26 and tightened to retain body 34, and its associated ring arm 18 and ring 16, in place. Because body 34 is slidingly engaged within tabs 20 and 22 and first side wall 12, the position of body 34 therewithin may be adjusted as needed or desired. Characteristics of a door to which the clip is attached, such as thickness, ornamental designs, and the like may result in depressions or protrusions in the door and may determine how far the screws need to be tightened to securely hold the clip 10 in place.

When door clip 10, 10' is associated with a door 200, side wall 14 is typically, but not necessarily, engaged with a front surface of the door. Side wall 15, 15' extends around the side 206, 208 of the door 200, and side wall 12 extends along a rear portion of the door. Side wall 15, 15' is configured sufficiently thin enough so that the door can close with the clip affixed thereto. When placed on an exterior door 200, passersby cannot detach the clip 10, 10' by manipulating the screws inserted through openings 24 and 26 because these are on the inside of the door and inaccessible. Clip 10, 10 may be secured to the door so firmly that an individual on the outside of the door will have a difficult time grasping or otherwise manipulating side wall 14. It is contemplated that, while the device of the present disclosure may be used with any door, some doors may be designed for use therewith and may be formed with impressions or indentations to receive side wall 14 such that the side wall is flush with the exterior surface of the door and presents no surface for manipulation from outside of the door.

Figure 6:
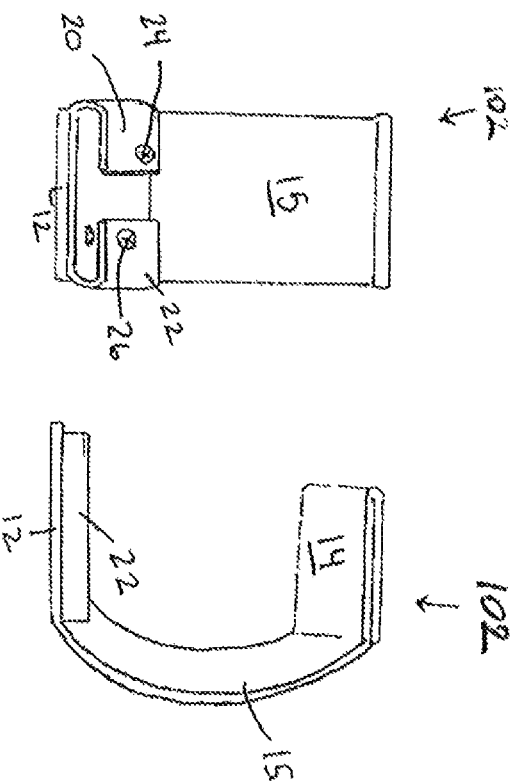
FIG. 6A is an inside view of an embodiment of a door clip of the present disclosure.
FIG. 6B is a profile view of the embodiment of the door clip shown in FIG. 6A.
Figure 7:
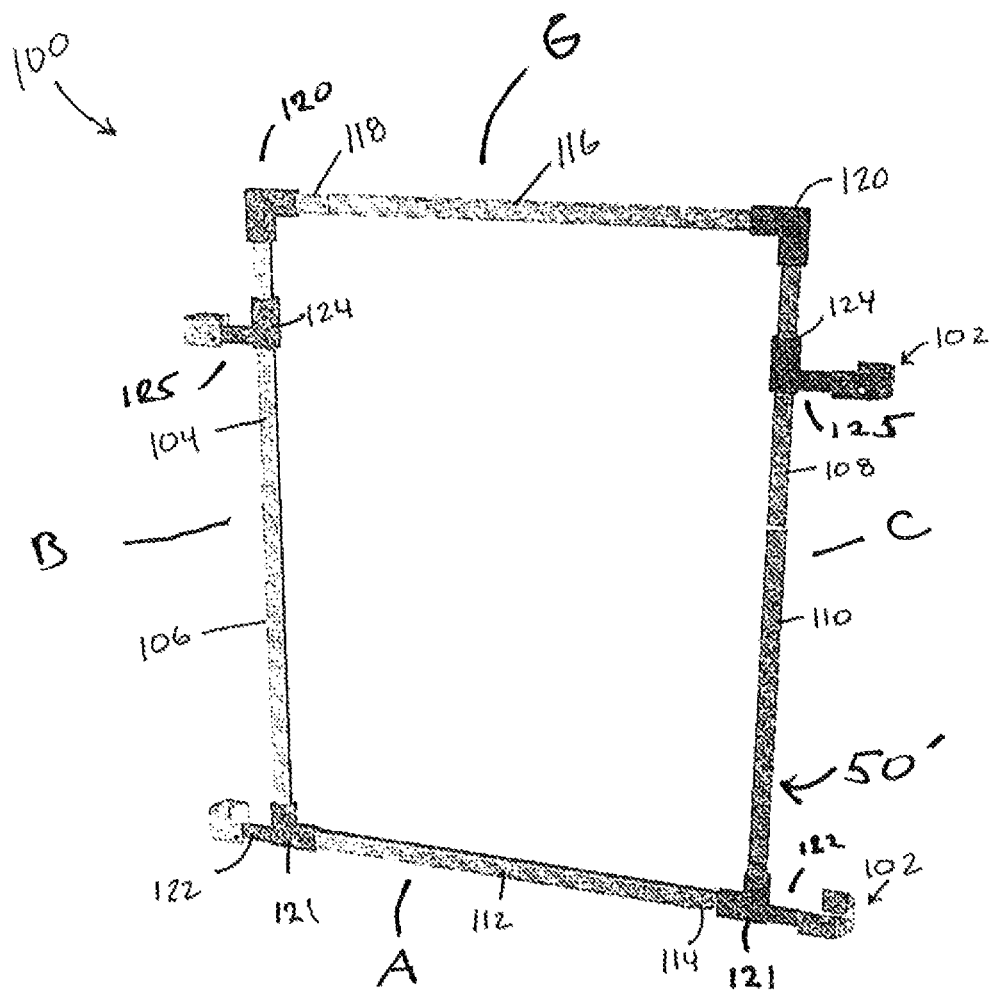
FIG. 7 is a first perspective view of one embodiment of a display holder which utilizes alternative embodiments of the door clips of the present disclosure.
Figure 8:
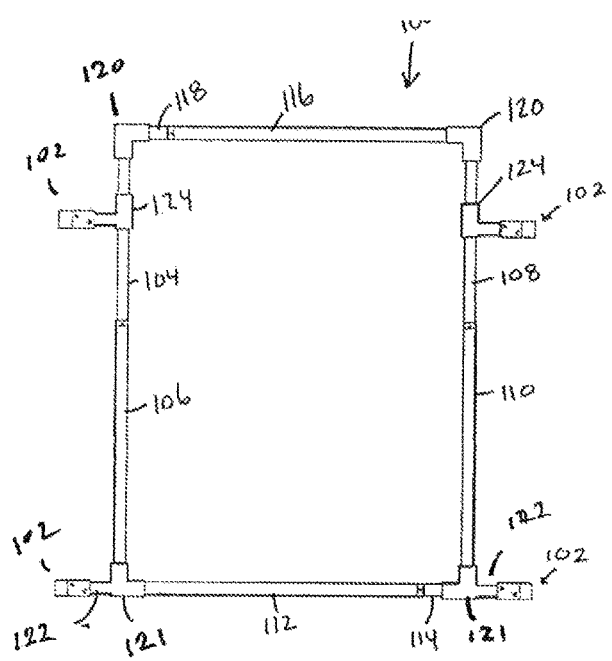
FIG. 8 is a front elevation view of one embodiment of a display holder which utilizes alternative embodiments of the door clips of the present disclosure.
Figure 9:
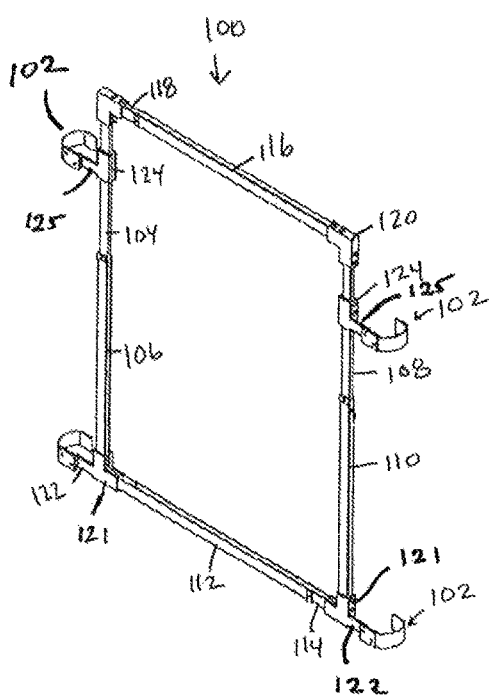
FIG. 9 is a front and side perspective view of the device of FIG. 8.
Figure 10:
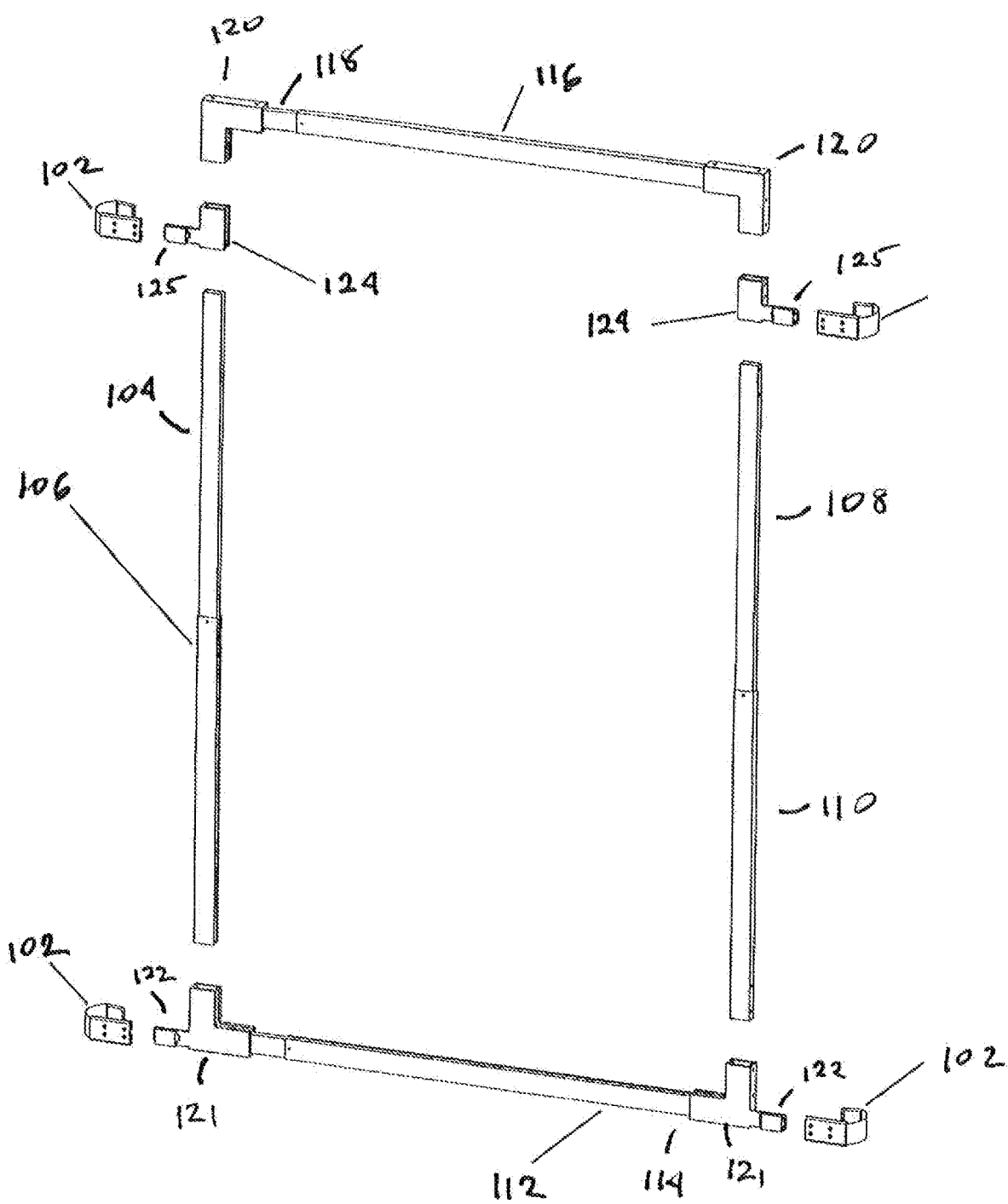
FIG. 10 is an exploded perspective view of the device of FIGS. 8-9.

FIGS. 6A and 6B provide views of an alternative embodiment of a door clip 102 but with this embodiment body 34 and associated ring arm 18 and ring 16 have been removed. This embodiment of door clip 102 may be utilized with a different embodiment of a display retaining assembly 50'. A second embodiment of the displayer holder 100 results when door clip 102 is utilized together with display retaining assembly 50' as depicted in FIGS. 7-10.

FIGS. 7-10 depict an embodiment of a display holder 100 comprising a retaining assembly 50' to which are attached a plurality of door clips 102 as described above. Display holder 100 includes four sets of telescoping bars that form the sides of a generally rectangular structure. For example, first telescoping bar 104 and second telescoping bar 106 form a left side rail B. First telescoping bar 104 and second telescoping bar 106 have the same general cross-section, with first telescoping bar 104 having a smaller cross-sectional width so that it is capable of being received within the hollow interior of second telescoping bar 106. A locking mechanism, such as a detent or pin, may be used to secure first telescoping bar 104 at the appropriate position along the length of second telescoping bar 106. Likewise, telescoping bars 108, 110 form a right side rail C. Telescoping bars 112, 114 form a bottom rail member A which spans between the left side rail and the right side rail. Telescoping bars 116, 118 form an upper rail member G which also spans between the left side rail B and the right side rail C. Thus, the overall dimensions of display holder 100 can be adjusted as required for any particular door 200 to fit any rectangular display D or device.

Display holder 100 further includes top elbow joints 120 at the top two corners. Display holder 100 further includes bottom elbow joints 121 at the bottom two corners. Bottom elbow joints 121 differ from elbow joints 120 in that the bottom elbow joints are in a "tee" configuration having an arm portion 122 extending outwardly from the joint. Elbow joints 120, 121 are sized, shaped, and configured to receive each of the ends of the telescoping bars that form the sides of the display holder 100, with each elbow joint 120, 121 receiving the ends of two telescoping bars. As shown in the figures, arm portion 122 of bottom elbow joints 121 are configured for attachment of door clips 102

Embodiments of display holder 100 also have clip tracks 124 each slidingly engaged with a respecting telescoping bar. A left side clip track 124 is positioned on the left side rail comprising telescoping bars 104, 106. Left side clip track 124 comprises an extension arm 125 which is configured for attachment of a door clip 102. Likewise, a right side clip track 124 is positioned on the right side rail comprising telescoping bars 108, 110 and right side clip track 124 also comprises an extension arm which is configured for attachment of a door clip 102. Clip tracks 124 allow for adjustable positioning of a door clip 102 along the length of a side of display holder 100. A detent, pin, or other mechanism may be used to secure a clip track 124 at a desired location.

Although the embodiment shown in FIGS. 7-10 have attachment points for the door clips 102 at the bottom elbow joints 121 at the bottom and at the two clip tracks 124 at opposing sides of the device, it is contemplated that all clips may be attached to elbow joints, or that all clips may be attached to slide members, or that any combination of the two may be used. In embodiments wherein all clips are attached to slide members, it should be noted that elbow joints (without clips) are still used at the corners of the device for structural integrity.

The various embodiments of a door display holder may be used to attach a variety of displays D to a door 200. The door display holder may be attached so that only side walls 14 of each clip 10, 102 are on the exterior of the door thereby limiting manipulation by individuals outside the door. Such displays may be retained between the first side wall 12 or second side wall 14 of a door clip and the door, or between retaining assembly 50, 50' and the door. The displays may be thin structures having advertisements, business hours, or any other desired indicia thereon.

Figure 11:
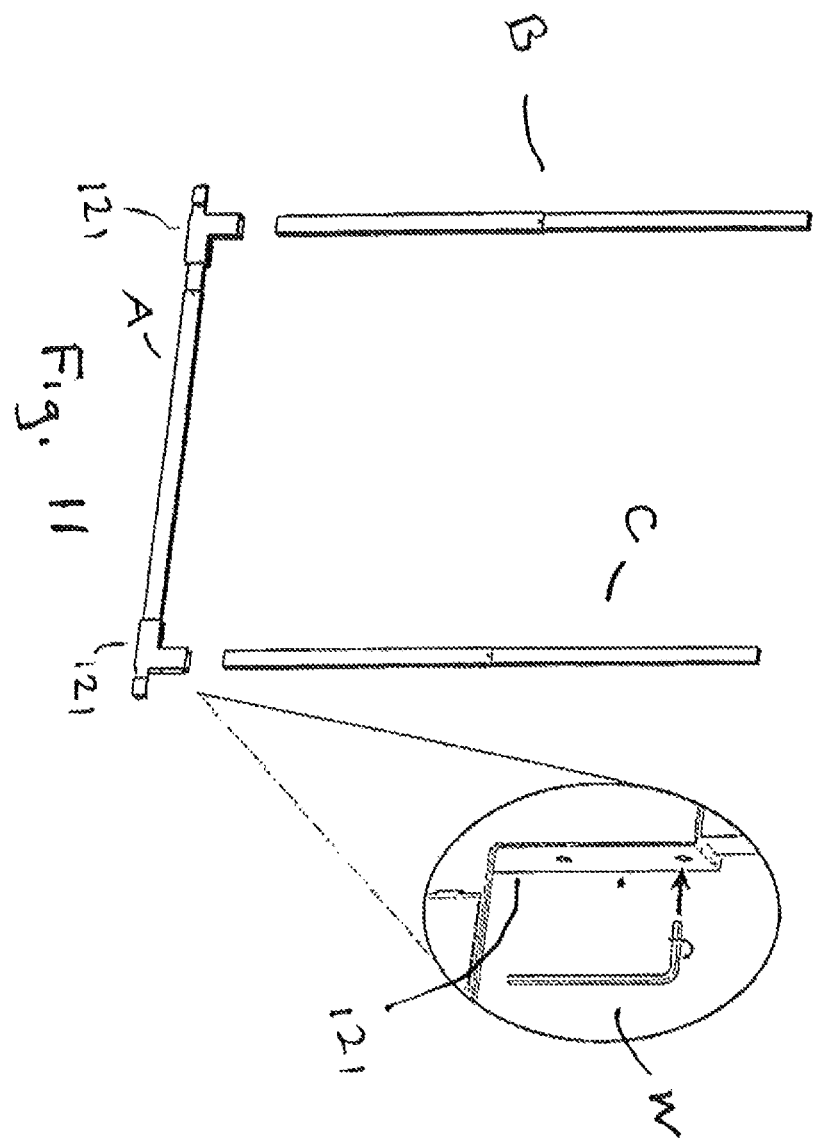
FIG. 11 shows a first step in the assembly of an embodiment of a display holder which utilizes emboodiments of the door clips of the present disclosure.

FIGS. 11-17 illustrate a method of installing embodiments of a display holder 100 to a door 200. As shown in FIG. 11, left side rail B and right side rail C are inserted into bottom elbow joints 121 and screws are inserted into the bottom elbow joints to secure the left side rail and the right side rail. As indicated, allen screws tightened with an allen wrench W may be utilized for this purpose.

Figure 12:
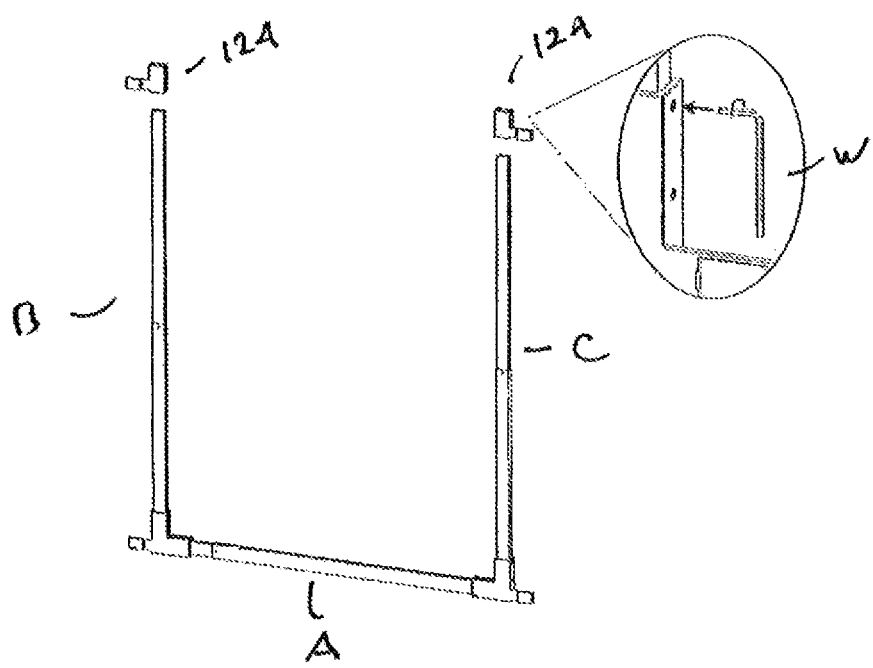
FIG. 12 shows a second step in the assembly of an embodiment of a display holder which utilizes emboodiments of the door clips of the present disclosure.

FIG. 12 shows left and right side clip tracks 124 being slid respectively over left side rail B and right side rail C. Once positioned in the approximately correct position along the length of the left side rail B and the right side rail C, screws are tightened to maintain the clip tracks in the desired position on the rails.

Figure 13:
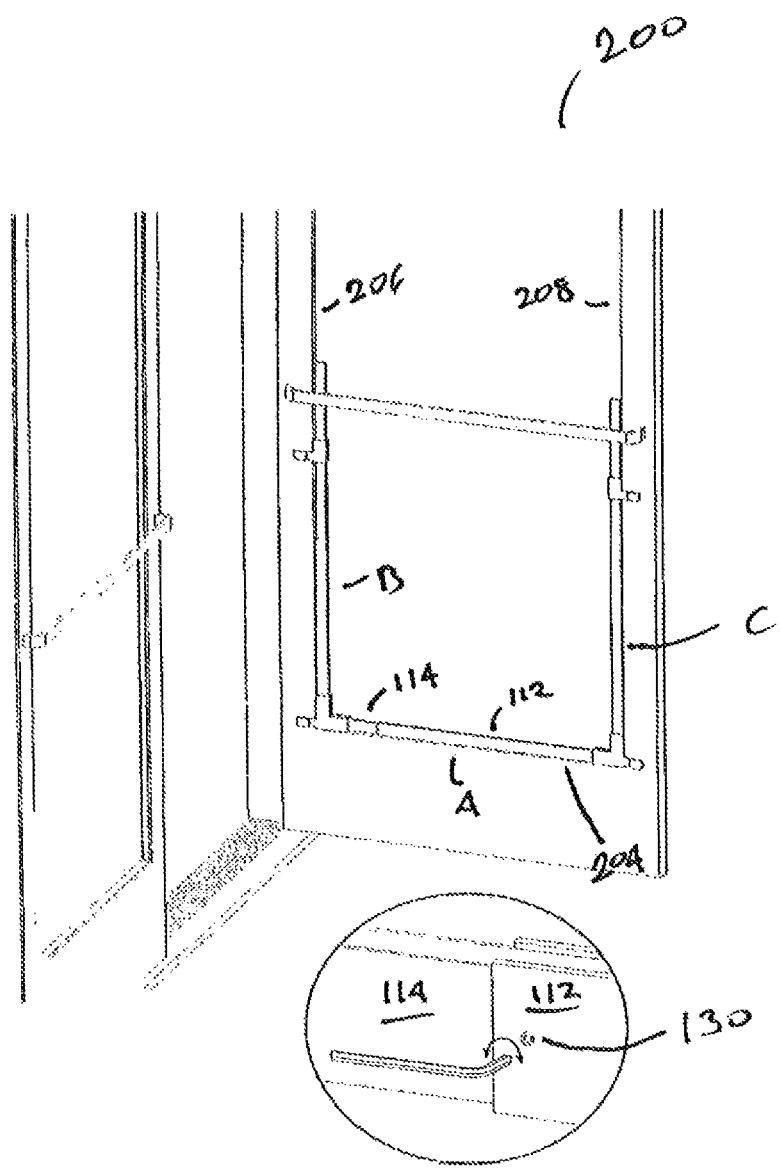
FIG. 13 shows a third step in the assembly of an embodiment of a display holder which utilizes emboodiments of the door clips of the present disclosure.

FIG. 13 shows the assembly formed by the above steps being set within a glass pocket of a door 200 so that the bottom rail A is resting on the lip at the bottom 204 of the glass pocket. The telescoping rails 112, 114 which comprise bottom rail A are held in position by screw 130. Screw 130 is loosened and left side rail B and right side rail C are slid laterally until left side rail B makes contact with left side 206 of the window pocket and right side rail C makes contact with right side 208 of the window pocket, at which point screw 130 is tightened.

Figure 14:
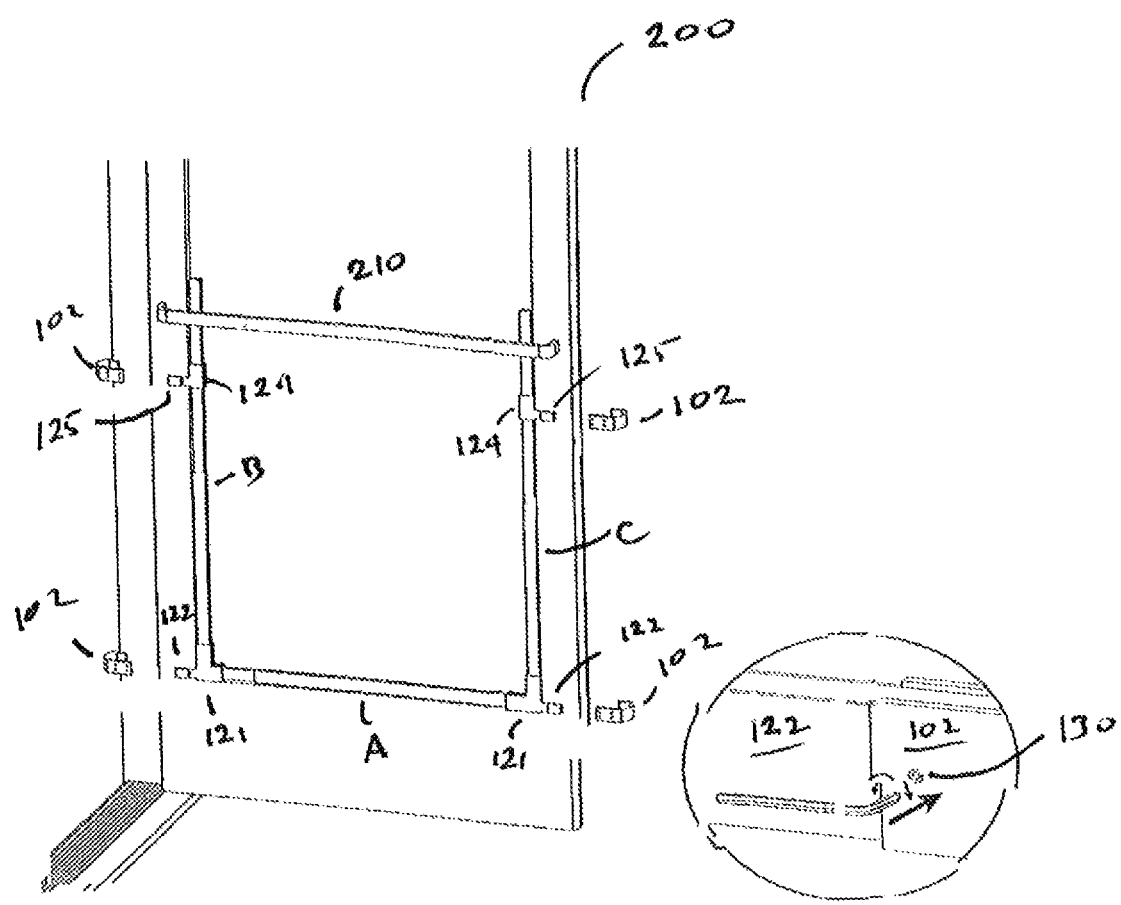
FIG. 14 shows a fourth step in the assembly of an embodiment of a display holder which utilizes emboodiments of the door clips of the present disclosure.

FIG. 14 shows door clips 102 being attached to arm portions 122 of bottom elbow joints 121 and to extension arms 125 of clips tracks 124 by use of screws 130 which secure the door clips 102 to arm portions 122 and extension arms 125.

Figure 15:
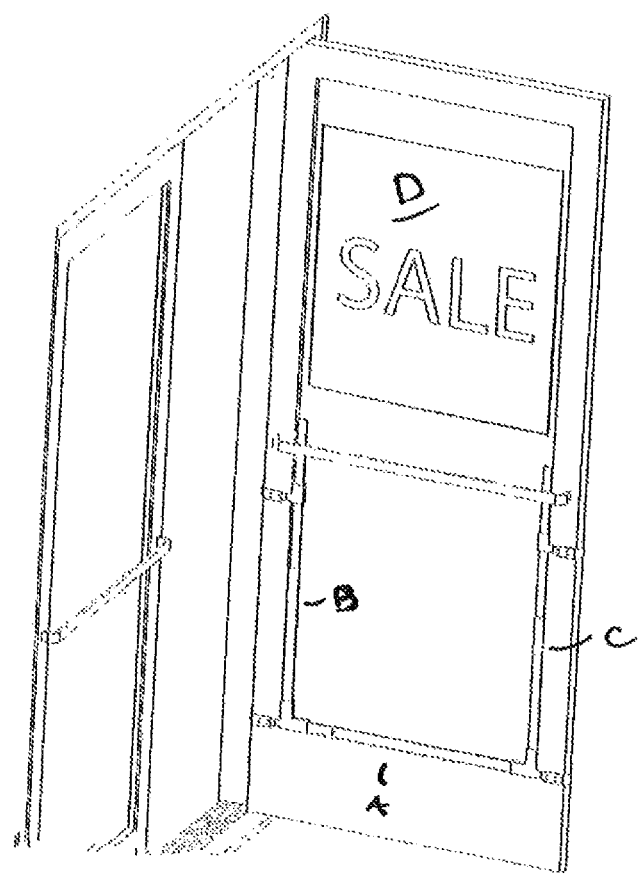
FIG. 15 shows a fifth step in the assembly of an embodiment of a display holder which utilizes emboodiments of the door clips of the present disclosure.

FIG. 15 shows a display D being inserted into inwardly facing channels of the left side rail B and the right side rail C. Display D is slid downwardly until it is inserted into an upwardly facing channel of bottom rail A.

Figure 16:
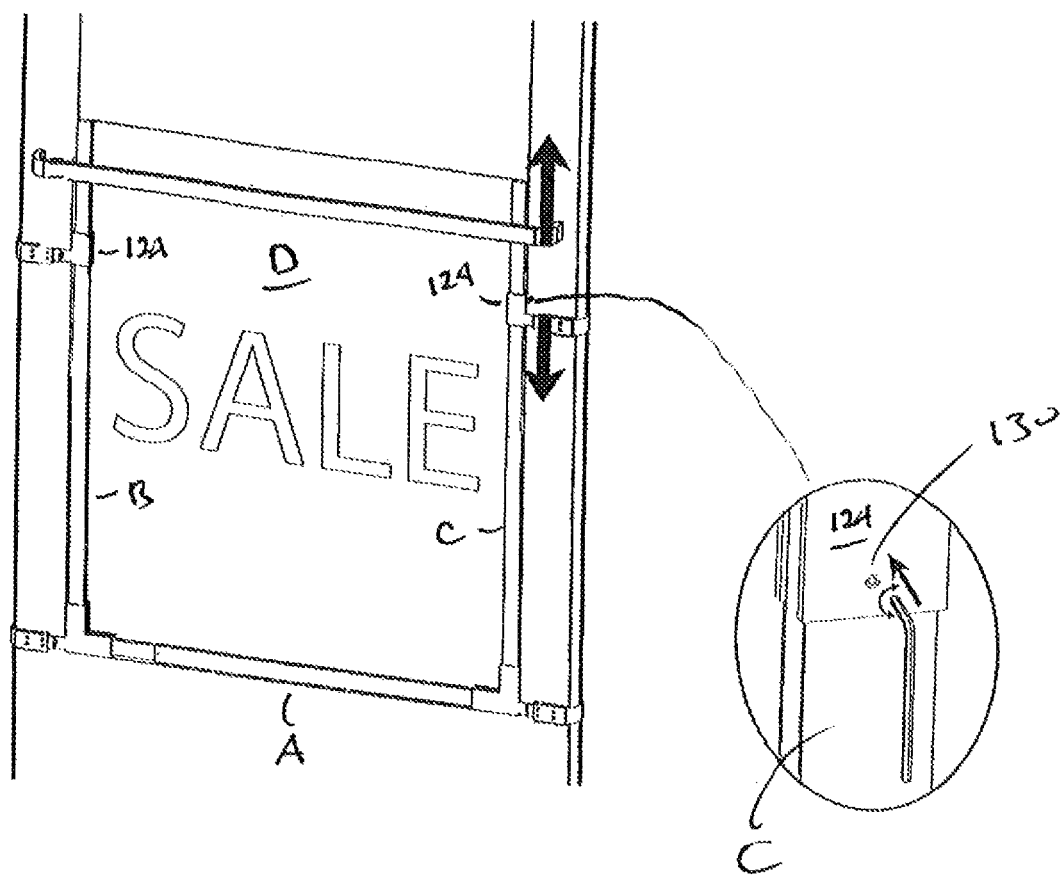
FIG. 16 shows a sixth step in the assembly of an embodiment of a display holder which utilizes embodiments of the door clips of the present disclosure.

FIG. 16 shows how left and right side slide clips 124 may be adjusted by loosening screw 130 and sliding the left and right side clips 124 as desired along the lengths of left side rail B and right side rail C to adjust the height to be even with the display D.

Figure 17:
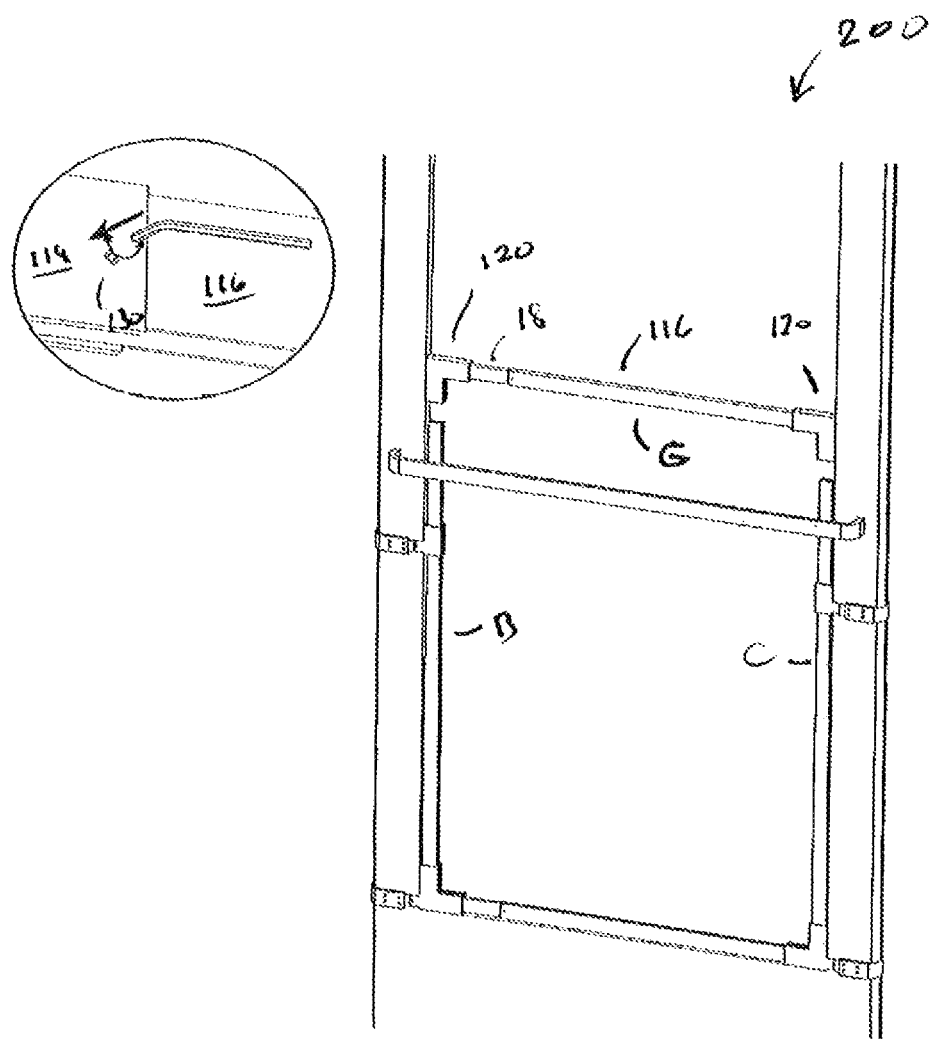
FIG. 17 shows a seventh step in the assembly of an embodiment of a display holder which utilizes emboodiments of the door clips of the present disclosure.

FIG. 17 shows how telescoping bars 116 and 118 may be adjusted to fit into the glass pocket of door so that top elbow joints 120 fit over the upper ends of left side rail B and right side rail C. Screws in top elbow joints 120 are thereafter tightened to secure the top elbow joints to the upper ends of the side rails.

In some embodiments of the present disclosure, a display holder may be provided to secure an electronic video monitor, such as a flat panel LCD or other monitor, to the interior of a glass door. The telescoping sides of the display holder may be sized so as to engage the monitor and hold it in place. The monitor may be secured within the structure in any suitable manner.

Further, it is contemplated that in some embodiments of the present disclosure the arms attached to the display holder and door clips may be of varying length, extendable or retractable according to the needs or desires of the user. This may be accomplished, for example, with telescoping members extending between the door clip and the display holder.

Various components of the present disclosure may be formed integrally—for example, ring 16 and ring arm 18 may be constructed from a single, unitary portion of material—or may be formed of individual pieces attached in any suitable manner.

Having thus described the preferred embodiment of the invention, what is claimed as new and desired to be protected by Letters Patent includes the following:

1. A device for securing a display to a door, the door being of the type having a glass pocket wherein a glass window is disposed in the glass pocket, the glass pocket having a top, a bottom, a left side and a right side, the device comprising:
   a first attachment clip comprising a first side wall, a second side wall, and an end wall extending between the first side wall and the second side wall, and an arm attached to the first side wall and extending away therefrom; and
   a display retaining assembly comprising a frame assembly having a left side rail which is configured to be urged against the left side of the glass pocket, the frame assembly further comprising a right side rail which is configured to be urged against the right side of the glass pocket, the frame assembly further comprising a lower left side clip track attached at a bottom of the left side rail and a lower right side clip track attached at a bottom of the right side rail, and a bottom rail member spanning between the left side rail and the right side rail, the bottom rail member comprising a left end attached to the lower left side clip track and a right end attached to the lower right side clip track, wherein the bottom rail member is configured to be disposed at the bottom of the glass pocket, the display retaining assembly attached to an end of the arm distal to the end wall, wherein the display retaining assembly is configured to apply a load causing the first side wall to engage a first surface of said door, the second side wall to engage a second side of said door, and urging the end wall against a side of said door.

2. The device of claim 1 wherein the arm has an adjustable length allowing the end of the arm to be adjusted with respect to the first side wall.

3. The device of claim 1 wherein the first attachment clip attaches to the lower left side clip track and the second attachment clip attaches to the lower right side clip track.

4. The device of claim 3 further comprising an upper left side clip track attached at an upper end of the left side rail, the device further comprising an upper right side clip track attached at an upper end of the right side rail.

5. The device of claim 4 comprising a third attachment clip attached to the upper left side clip track and a fourth attachment clip attached to the upper right side clip track.

6. The device of claim 5 further comprising an upper rail member which spans between the left side rail and the right side rail, the upper rail member disposed above the upper left side clip track and the upper right side clip track.

7. A method of attaching a display to a glass door, the glass door having a sheet of glass disposed within a glass pocket having a bottom, a left side and right side, the method comprising the following steps:

attaching a left side rail having an inwardly facing channel and a right side rail having an inwardly facing channel to a bottom rail, the bottom rail comprising a left side tee-member having an upwardly facing opening for receiving the left side rail, the bottom rail further comprising a right side tee-member having an upwardly facing opening for receiving the right side rail, the bottom rail further comprising an upwardly facing channel;

sliding a left side clip track over the left side rail;

securing the left side clip track to a fixed position at an upper end of the left side rail;

sliding a right side clip track over the right side rail;

securing the right side clip track to a fixed position at an upper end of the right side rail;

setting the bottom rail at the bottom of the glass pocket;

urging the left side rail against the left side of the glass pocket;

urging the right side rail against the right side of the glass pocket;

attaching a lower left side clip member to the left side tee-member and to a lower left side of the glass door;

attaching a lower right side clip member to the right side tee-member and to a lower right side of the glass door;

attaching an upper left side clip to the left side clip track and to an upper left side of the glass door;

attaching an upper right side clip to the right side clip track and to an upper right side of the glass door;

inserting the display into the inwardly facing channels of the left side rail and the right side rail;

sliding the display downwardly until a lower edge of the display is inserted into the upwardly facing channel of the bottom rail; and installing a top rail which spans between the left side rail and the right side rail.

\* \* \* \* \*